(12) United States Patent
Relan

(10) Patent No.: US 7,712,201 B2
(45) Date of Patent: May 11, 2010

(54) METHOD FOR INSTALLING A SEAL

(75) Inventor: Krishna K. Relan, Canton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1259 days.

(21) Appl. No.: 11/238,833

(22) Filed: Sep. 29, 2005

(65) Prior Publication Data
US 2007/0067978 A1    Mar. 29, 2007

(51) Int. Cl.
*B23P 11/02* (2006.01)
(52) U.S. Cl. .......................................................... 29/450
(58) Field of Classification Search ................... 29/450, 29/428, 525, 436, 464, 466, 468, 759; 277/345
See application file for complete search history.

(56) References Cited

FOREIGN PATENT DOCUMENTS

JP          404041131       *   2/1992

* cited by examiner

*Primary Examiner*—John C Hong
(74) *Attorney, Agent, or Firm*—Quinn Law Group, PLLC

(57) ABSTRACT

An improved method and apparatus for installing a seal is provided. The method is preferably applied to install a lip seal onto a clutch shaft of a hydraulic clutch assembly. The clutch shaft defines a lip seal groove adapted to receive the lip seal. An installation cone and a driver are provided to facilitate the installation of the lip seal into the lip seal groove. The driver is hollow and generally cylindrical, and includes a plurality of angular fingers. The installation cone is initially placed over an end portion of the clutch shaft. Thereafter, the lip seal is placed onto the installation cone. The driver is then pushed over the installation cone such that the angular fingers engage the lip seal and push the lip seal into the lip seal groove without seal roll-over.

13 Claims, 3 Drawing Sheets

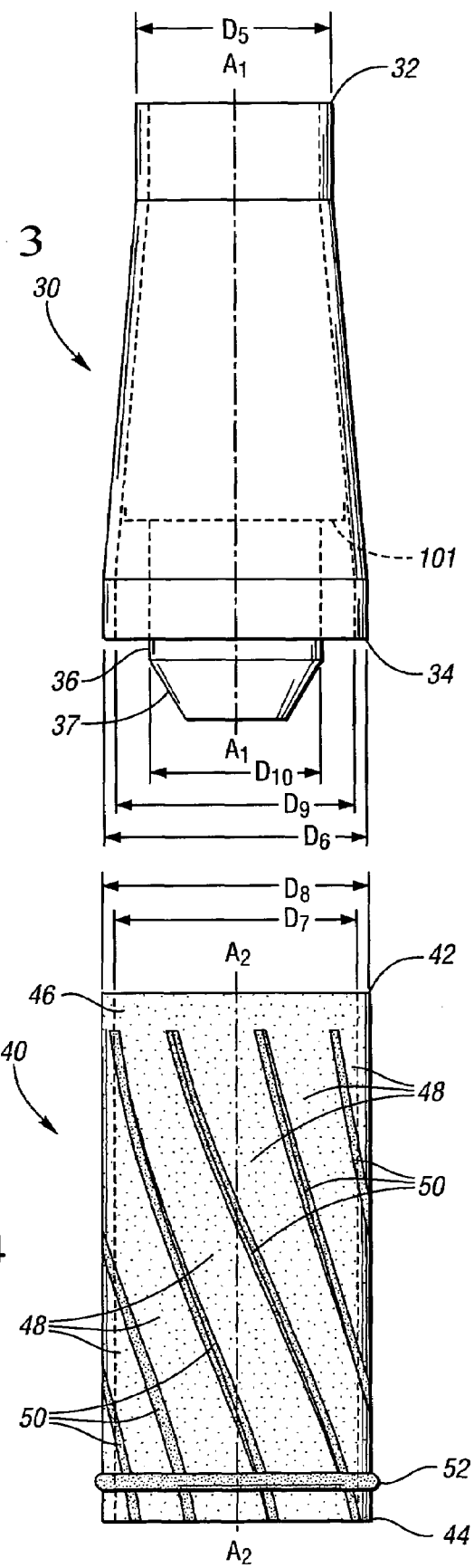

METHOD FOR INSTALLING A SEAL

TECHNICAL FIELD

The present invention relates to an improved method and apparatus for installing a seal to resist seal roll-over.

BACKGROUND OF THE INVENTION

Hydraulic clutches generally include pressurized hydraulic fluid for actuation of the clutch. One or more seals are implemented to maintain hydraulic pressure and ensure optimal clutch performance. Some hydraulic clutches implement a lip seal for such purposes. The lip seal is preferably installed without rolling over during the installation process in order to create an effective seal and thereby maintain hydraulic clutch pressure.

SUMMARY OF THE INVENTION

The present invention is drawn to an improved method for installing a seal such that the seal roll-over incidence rate is minimized. For purposes of this disclosure, "seal roll-over" is defined as an installation wherein the seal is partially rolled or twisted. According to a preferred embodiment, the method of the present invention is applied to install a lip seal onto a clutch shaft of a hydraulic clutch assembly. The clutch shaft defines a lip seal groove adapted to accommodate the lip seal.

An installation cone and a driver are provided to facilitate the installation of the lip seal into the lip seal groove. The installation cone is preferably generally hollow and includes an internal annular shoulder and an alignment shaft extending therefrom. The driver is hollow and generally cylindrical, and includes a plurality of angular fingers.

According to the preferred method of the present invention, the installation cone is initially placed over a portion of the clutch shaft such that the alignment shaft is inserted into a hollow end portion of the clutch shaft, and an end portion of the clutch shaft engages the annular shoulder of the installation cone to radially and axially align the installation cone relative to the clutch shaft. After the installation cone is placed over a portion of the clutch shaft, the lip seal is placed onto the installation cone. Thereafter, the driver is pushed over the installation cone such that the angular fingers engage the lip seal and push the lip seal into the seal groove with improved resistance to seal roll-over.

According to one aspect of the invention, a sufficiently elastic ring is disposed around the plurality of annular fingers of the driver such that radial expansion of the plurality of annular fingers is resisted.

According to another aspect of the invention, the installation cone includes a smooth exterior surface such that the seal may be transferred across the exterior surface of the installation cone without rolling over and with minimal resistance.

According to yet another aspect of the invention, the plurality of angular fingers of the driver define a plurality of angular slots therebetween that are adapted to facilitate the radial expansion of the plurality of angular fingers.

According to still another aspect of the invention, the plurality of angular fingers are configured to translate a single applied force into two or more force components sufficient to resist seal roll-over.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a plan view of a lip seal of the clutch assembly of FIG. 1;

FIG. 3 is a side elevational view of an installation cone in accordance with the present invention;

FIG. 4 is a side elevational view of a driver in accordance with the present invention.

DESCRIPTION OF THE PREFERRED EMBODIMENTS

Figure 1:
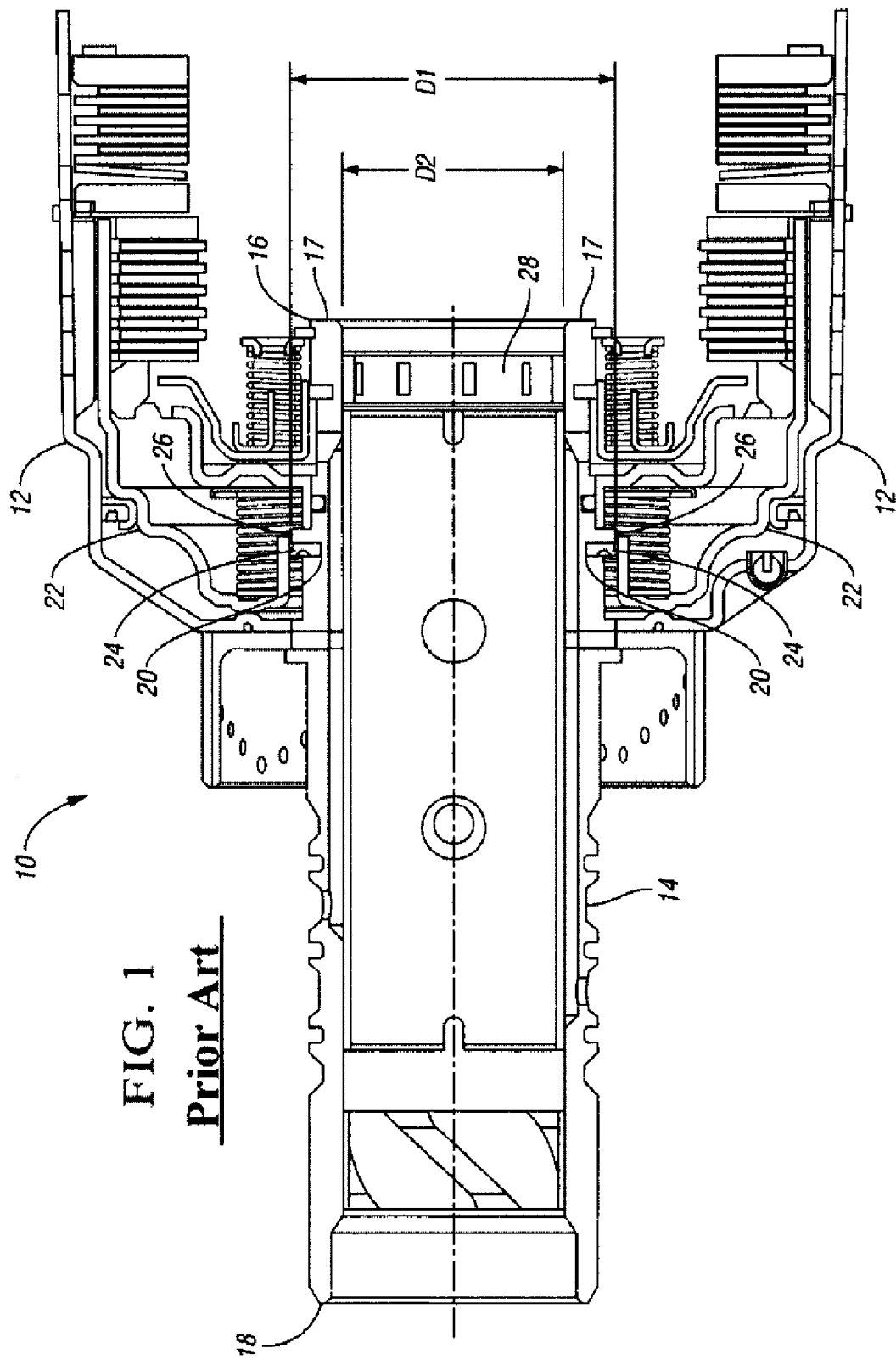
FIG. 1 is a cross sectional view of a clutch assembly in accordance with the present invention.

Referring to the drawings wherein like reference numbers refer to like components, FIG. 1 shows a sectional view of a hydraulic clutch assembly 10. The clutch assembly 10 includes a housing 12. A generally cylindrical clutch shaft 14 includes a first end portion 16 and a second end portion 18 opposite the first end portion 16. The clutch shaft 14 is inserted into the housing 12 such that the first end portion 16 of the shaft 14 extends into the housing 12 and the second end portion 18 of the shaft 14 remains outside the housing 12. The clutch assembly 10 includes a piston assembly 22 disposed within the housing 12 and adapted to translate in an axial direction relative to the clutch shaft 14.

The first end portion 16 of the clutch shaft 14 preferably defines a generally flat annular end face 17. The clutch shaft 14 defines a hollow end portion 28 disposed radially within the annular end face 17. The clutch shaft 14 also defines a lip seal groove 20 about the circumference of the clutch shaft 14 nearer the first end portion 16 than the second end portion 18. The clutch shaft 14 includes a peripheral flange 26 adjacent the lip seal groove 20, located between the lip seal groove 20 and the first end portion 16. The peripheral flange 26 defines an outer diameter D1. The clutch shaft 14 defines an inner diameter D2 at the first end portion 16.

After the first end portion 16 of the clutch shaft 14 is inserted into the housing 12, a lip seal 24 is disposed within the lip seal groove 20 as will be described in detail hereinafter. The piston assembly 22 engages the lip seal 24 as the piston assembly 22 is translated. The lip seal 24 is configured to seal with respect to the piston assembly 22 and thereby maintain hydraulic pressure of the clutch assembly 10 as the piston assembly 22 is actuated.

As shown in FIG. 2, the lip seal 24 is generally annular and defines an inner diameter D3 and an outer diameter D4. The lip seal 24 is preferably composed of an elastic material such as rubber. Accordingly, the lip seal 24 may be sufficiently elastically deformed or expanded to increase the inner and outer diameters D3, D4, and the inner and outer diameters D3, D4 will return to their steady state values in the absence of an applied force.

Referring to FIGS. 3-4, an installation cone 30 and a driver 40 are provided to facilitate the installation of the lip seal 24 (shown in FIG. 2) within the lip seal groove 20 (shown in FIG. 1).

As shown in FIG. 3, the installation cone 30 defines a hollow truncated conical shape having an axis A1. The installation cone 30 is preferably composed of a material having a smooth surface, such as a polished metallic material, so that the lip seal 24 (shown in FIG. 2) can slide or be translated across the external surface of the installation cone 30 without rolling over. The installation cone 30 includes a first end portion 32 and a second end portion 34 opposite the first end portion 32. The end portion 32 defines an outer diameter D5 that is smaller than the steady state value of the inner diameter D3 of the lip seal 24. The end portion 34 defines an outer diameter D6 that is larger than the steady state value of the inner diameter D3 of the lip seal 24. The end portion 34 also defines an inner diameter D9 that is slightly greater than the outer diameter D1 defined by the peripheral flange 26 of the clutch shaft 14 (shown in FIG. 1).

According to a preferred embodiment, the installation cone 30 include an internal annular shoulder 101 and an alignment shaft 36 extending axially from the shoulder 101 such that the installation cone 30 protrudes beyond the end portion 34. The alignment shaft 36 defines an outer diameter D10 that is slightly smaller than the inner diameter D2 of the clutch shaft 14 (shown in FIG. 1). The alignment shaft 36 preferably terminates in a reduced diameter tapered portion 37 to facilitate the insertion of the alignment shaft 36 into the hollow end portion 28 (shown in FIG. 1) of the clutch shaft 14.

As shown in FIG. 4, the driver 40 defines a hollow cylindrical shape having an axis A2. According to a preferred embodiment, the driver 40 is composed of nylon, however, alternate compositions may be envisioned. The driver 40 includes a first or drivable end portion 42 and a second or seal and cone engageable end portion 44 opposite the first end portion 42. The driver 40 is composed of a solid or continuous annular portion 46 extending from the first or drivable end portion 42 toward the second or seal and cone engageable end portion 44, and a plurality of angular fingers 48 angularly or spirally extending from the solid annular portion 46 to the second end portion 44. The angular fingers 48 define a plurality of angular or spiral slots 50 therebetween. The angular fingers 48 and angular slots 50 are so named because, according to a preferred embodiment, they form an angle of approximately 24 degrees relative to the axis A2 of the driver 40.

The generally hollow cylindrical shape of the driver preferably defines a steady state inner diameter D7 and an outer diameter D8. It should be appreciated that the angular fingers 48 and angular slots 50 allow the second end portion 44 of the driver 40 to radially expand such that the inner and outer diameters at the end portion 44 may be expandable beyond the steady state values D7, D8. An elastic ring 52 is preferably disposed about the circumference of the driver 40 near the second end portion 44. The elastic ring 52 is adapted to constrain the angular fingers 48 such that the radial expansion of the end portion 44 is resisted. In other words, the end portion 44 may be radially expanded only by stretching the elastic ring 52, and thereafter the elastic ring 52 tends to bring or contract the inner and outer diameters of the end portion 44 back to their steady state values D7, D8.

Figure 5:
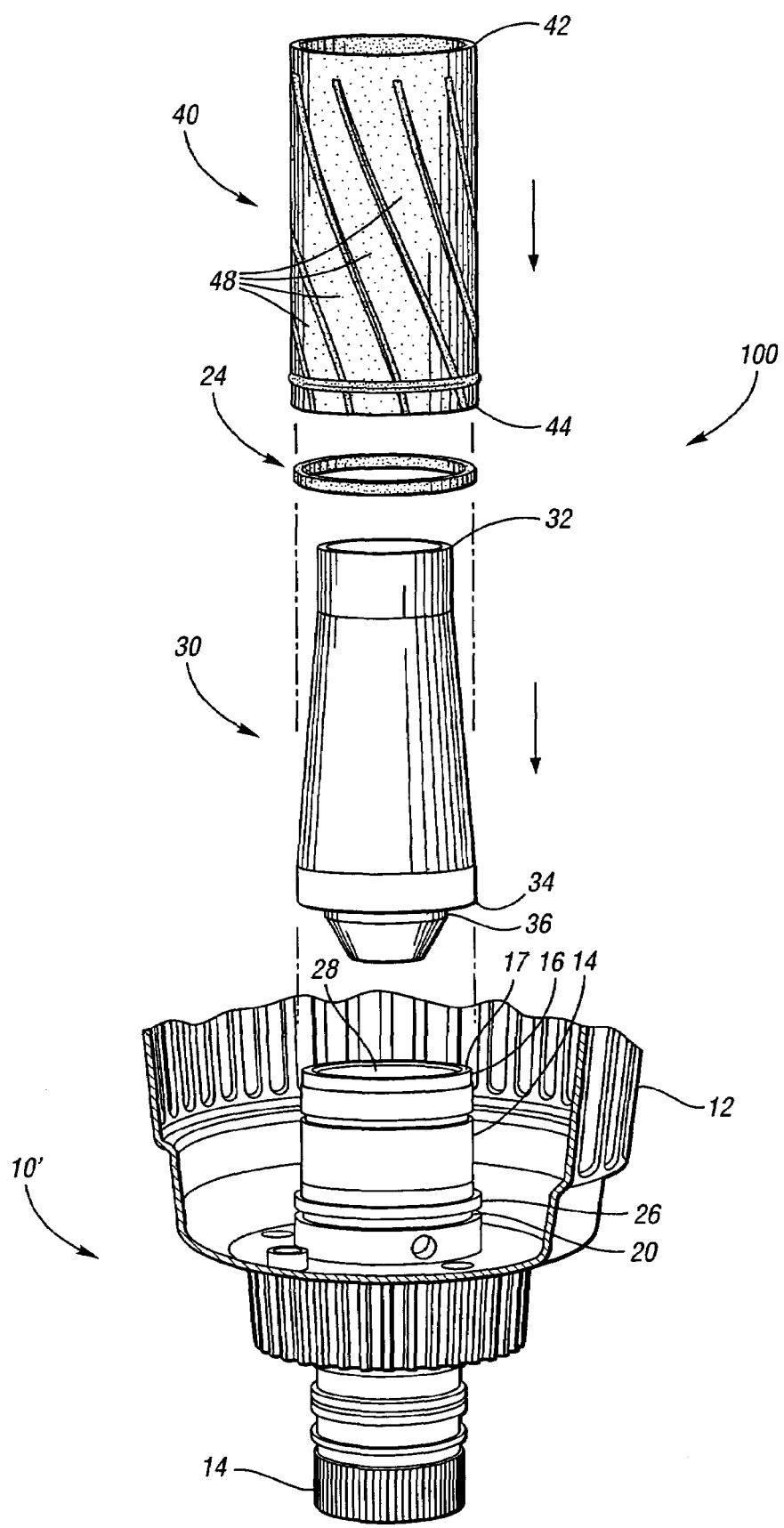
FIG. 5 is an exploded partially cut away isometric view of seal installation parts showing the installation of the lip seal of FIG. 2 onto the clutch assembly of FIG. 1.

Referring to FIG. 5, a preferred method 100 for assembling the lip seal 24 onto the clutch shaft 14 is shown. The method 100 for assembling the lip seal 24 onto the clutch shaft 14 is preferably performed during an early stage of the assembly process of the clutch assembly 10 so that the lip seal groove 20 is accessible. Accordingly, FIG. 5 depicts a partially cutaway isometric view of an incomplete clutch assembly 10' which includes the clutch shaft 14 and the clutch housing 12.

The preferred method of the present invention initially includes disposing the installation cone 30 over the end portion 16 of the clutch shaft 14 such that the end portion 34 of the installation cone 30 just fits over the peripheral flange 26 of the clutch shaft 14, and the flat annular end face 17 of the clutch shaft 14 engages the shoulder 101 (shown in FIG. 3) of the installation cone 30. While the installation cone 30 passes over the end portion 16 of the clutch shaft 14, the alignment shaft 36 is inserted into the hollow end portion 28 of the clutch shaft 14. This operation is preferably manually performed but may, alternatively, be automated.

The installation cone 30 is initially radially aligned relative to the clutch shaft 14 as the alignment shaft 36 is inserted into the hollow end portion 28 of the clutch shaft 14. Additional radial alignment is provided as the end portion 34 of the installation cone 30 is fit over the peripheral flange 26 of the clutch shaft 14. The engagement between the annular end face 17 and the shoulder 101 limits the insertion depth of the clutch shaft 14 into the installation cone 30 to a predetermined value such that the installation cone 30 is axially aligned relative to the clutch shaft 14.

After the installation cone 30 is disposed over the end portion 16 of the clutch shaft 14, the lip seal 24 is placed onto the installation cone 30 around the end portion 32 and slid in an axial direction toward the end portion 34. As the inner diameter D3 (shown in FIG. 2) of the lip seal 24 is greater than the outer diameter D5 (shown in FIG. 3) of the end portion 32, the lip seal 24 may be easily placed over the end portion 32 of the installation cone 30 and slid toward the end portion 34 until the outer diameter of the installation cone 30 exceeds the inner diameter D3 of the lip seal 24. At the completion of this step, the lip seal 24 is disposed around the installation cone 30 at an axial location at which the outer diameter of the installation cone 30 meets or just exceeds the steady state inner diameter of the lip seal 24.

After the lip seal 24 is placed onto the installation cone 30, the driver 40 is pushed over the installation cone 30 such that the end portion 44 of the driver 40 engages the lip seal 24 and pushes the seal 24 beyond the end portion 34 of cone 30 and into the lip seal groove 20. As the driver 40 is translated along the axial length of the installation cone 30 from the end portion 32 toward the end portion 34, the angular fingers 48 and the lip seal 24 radially expand to accommodate the increasing diameter of the installation cone 30. The lip seal 24 is pushed by the driver 40 from the installation cone 30 into the lip seal groove 20. As the lip seal 24 is translated into the lip seal groove 20, the inner and outer diameters D3, D4 (shown in FIG. 2) of the lip seal 24 are elastically retracted such that the lip seal 24 is securely retained in the lip seal groove 20.

A force or push applied to the driver 40 in an axial direction is converted by the angled fingers 48 of the driver 40 into a first component F1 parallel to the surface of the installation cone 30, a second component F2 acting in a radial direction and a third component F3 tangential to the surface of the installation cone 30 perpendicular to force components F1 & F2. It has been observed the application of the third force component F3 to the lip seal 24 during installation reduces seal roll-over. This technical advantage results from angular fingers 48 extending sufficiently angularly around the cylindrical driver 40 to push the seal 24 along the smooth surface of the installation cone 30 without causing the seal 24 to roll-over. It has also been observed that the preferred embodiment wherein the angled fingers 48 form an angle of approximately 24 degrees relative to the axis A2 provides an optimal ratio of the first, second and third force components F1, F2, F3 and thereby minimizes seal roll-over. For purposes of this disclosure, "seal roll-over" is defined as an installation wherein the seal is partially rolled or twisted.

Advantageously, installation of the lip seal 24 with the angled fingers 48 of the driver 40 as described hereinabove reduces the magnitude of the applied force required to radially expand the end portion 44 of the driver 40. As this operation may be manually performed, the reduction of the requisite applied force reduces operator burden and is therefore ergonomically desirable.

While the best modes for carrying out the invention have been described in detail, those familiar with the art to which this invention relates will recognize various alternative designs and embodiments for practicing the invention within the scope of the appended claims.

The invention claimed is:

1. A method for installing a seal into a groove that is defined by a clutch shaft, said method comprising:
   providing an installation cone;
   providing a hollow generally cylindrical driver having a plurality of angular fingers;
   placing the installation cone over a portion of the clutch shaft;
   placing the seal onto the installation cone; and
   pushing the driver over the installation cone such that the angular fingers sufficiently engage the seal and push the seal into the groove to resist seal roll-over.

2. The method of claim 1, further comprising providing an elastic ring disposed around the plurality of angular fingers of the driver such that radial expansion of the plurality of angular fingers is resisted.

3. The method of claim 2, wherein said providing an installation cone includes providing a hollow installation cone having an alignment shaft at least partially protruding therefrom, said alignment shaft being adapted to facilitate radial alignment the installation cone relative to the clutch shaft.

4. The method of claim 3, wherein said providing an installation cone includes providing a hollow installation cone having an internal annular shoulder adapted to facilitate axial alignment the installation cone relative to the clutch shaft.

5. The method of claim 4, wherein said placing the installation cone over a portion of the clutch shaft includes placing the installation cone over a portion of the clutch shaft such that the alignment shaft is inserted into a hollow end portion of the clutch shaft, and an end portion of the clutch shaft engages the annular shoulder of the installation cone to radially and axially align the installation cone relative to the clutch shaft.

6. The method of claim 5, wherein said providing an installation cone includes providing an installation cone having a smooth exterior surface such that the seal is transferable across the exterior surface of the installation cone without rolling over.

7. The method of claim 6, wherein said providing a hollow generally cylindrical driver includes providing a hollow generally cylindrical driver having a plurality of angular fingers defining a plurality of angular slots therebetween, said plurality of angular slots being adapted to facilitate the radial expansion of the plurality of angular fingers.

8. The method of claim 7, wherein said providing a hollow generally cylindrical driver having a plurality of angular fingers includes providing a hollow generally cylindrical driver having a plurality of angular fingers which are adapted to translate a single applied force into two or more force components configured to resist seal roll-over.

9. A method for installing a lip seal comprising:
   providing a clutch assembly onto which the lip seal is installed, the clutch assembly having a generally cylindrical clutch shaft including a lip seal groove defined by the clutch shaft;
   providing an installation cone having an internally disposed annular shoulder and an alignment shaft extending therefrom;
   providing a hollow generally cylindrical driver having a plurality of angular fingers;
   providing an elastic ring disposed around the plurality of angular fingers of the driver such that radial expansion of the plurality of angular fingers is resisted;
   placing the installation cone over a portion of the clutch shaft such that the alignment shaft is inserted into a hollow end portion of the clutch shaft, and an end portion of the clutch shaft engages the annular shoulder of the installation cone to radially and axially align the installation cone relative to the shaft;
   placing the lip seal onto the hollow installation cone; and
   pushing the driver over the installation cone such that the angular fingers engage the lip seal and push the lip seal into the seal groove with a minimal seal roll-over incidence rate.

10. The method of claim 9, wherein said providing an installation cone includes providing an installation cone having a smooth exterior surface such that the lip seal may be transferred across the exterior surface of the installation cone without rolling over.

11. The method of claim 10, wherein said providing a hollow generally cylindrical driver includes providing a hollow generally cylindrical driver having a plurality of angular fingers defining a plurality of angular slots therebetween, said plurality of angular slots being adapted to facilitate the radial expansion of the plurality of angular fingers.

12. The method of claim 11, wherein said providing a hollow generally cylindrical driver having a plurality of angular fingers includes providing a hollow generally cylindrical driver having a plurality of angular fingers which are adapted to translate a single applied force into two or more force components configured to resist lip seal roll-over.

13. The method of claim 12, wherein said providing a hollow generally cylindrical driver includes providing a hollow generally cylindrical driver composed of nylon.

* * * * *